(12) United States Patent
Kuehlmann

(10) Patent No.: US 7,827,938 B2
(45) Date of Patent: Nov. 9, 2010

(54) METHOD FOR OPERATING A FECES CONVEYOR DEVICE

(75) Inventor: Josef Kuehlmann, Laer (DE)

(73) Assignee: Qalovis Farmer Automatic Energy GmbH, Laer (DE)

( * ) Notice: Subject to any disclaimer, the term of this patent is extended or adjusted under 35 U.S.C. 154(b) by 0 days.

(21) Appl. No.: 11/947,512

(22) Filed: Nov. 29, 2007

(65) Prior Publication Data

US 2008/0105212 A1    May 8, 2008

Related U.S. Application Data

(62) Division of application No. 10/562,645, filed as application No. PCT/DE2005/000994 on Jun. 2, 2005, now Pat. No. 7,614,365.

(30) Foreign Application Priority Data

Feb. 17, 2005   (DE) .................... 10 2005 007 120

(51) Int. Cl.
*A01K 1/01* (2006.01)
(52) U.S. Cl. .................... 119/451; 119/527
(58) Field of Classification Search ............. 119/439, 119/442, 447, 450, 451, 458, 479, 527, 164
See application file for complete search history.

(56) References Cited

U.S. PATENT DOCUMENTS

| | | | |
|---|---|---|---|
| 1,007,912 A | | 11/1911 | Black |
| 1,090,131 A | * | 3/1914 | Bowditch .................... 119/451 |
| 1,177,695 A | * | 4/1916 | Gable .......................... 119/451 |
| 1,274,219 A | * | 7/1918 | Ulbrecht ..................... 198/607 |
| 1,334,458 A | * | 3/1920 | Johnson ....................... 198/822 |
| 1,791,381 A | | 2/1931 | Rogers |
| 2,460,894 A | * | 2/1949 | Martinovich ................ 414/564 |
| 2,591,643 A | * | 4/1952 | Volmer ........................ 119/451 |
| 3,119,373 A | | 1/1964 | Schmid |
| 3,119,374 A | * | 1/1964 | Ladner ........................ 119/700 |
| 3,270,713 A | * | 9/1966 | Rubricius .................... 119/452 |
| 3,274,973 A | | 9/1966 | Woods et al. |
| 3,464,389 A | | 9/1969 | Seiderman |
| 3,685,493 A | * | 8/1972 | Weiland, Jr. ................. 119/451 |

(Continued)

FOREIGN PATENT DOCUMENTS

DE    3528604    2/1987

(Continued)

OTHER PUBLICATIONS

Custers translation from DE 3528604, retrieved from EPO website Jun. 13, 2008.*

(Continued)

*Primary Examiner*—Rob Swiatek
*Assistant Examiner*—Kristen C Hayes
(74) *Attorney, Agent, or Firm*—Greenblum & Bernstein, P.L.C.

(57) ABSTRACT

A system and method for operating a manure conveyor device. The method includes driving a first return roller about which a manure conveyor belt circulates at a first rotational speed, and driving a second return roller about which the manure conveyor belt circulates at a second rotational speed. During a first interval the first rotational speed exceeds the second rotational speed, and during a second interval the second rotational speed exceeds the first rotational speed.

16 Claims, 3 Drawing Sheets

U.S. PATENT DOCUMENTS

| | | |
|---|---|---|
| 3,791,348 A * | 2/1974 | Marnett ................. 119/482 |
| 3,980,170 A | 9/1976 | Jakes et al. |
| 3,982,499 A | 9/1976 | Frankl |
| 4,111,412 A | 9/1978 | Cathers |
| 5,462,156 A | 10/1995 | Kobayashi et al. |
| 5,558,234 A | 9/1996 | Mobley |
| 5,662,068 A | 9/1997 | Childs |
| 5,817,241 A | 10/1998 | Brayboy |
| 6,854,592 B2 | 2/2005 | Fukuoka |
| 2005/0028748 A1 | 2/2005 | Kuhlmann |
| 2006/0260911 A1 | 11/2006 | Eckert et al. |

FOREIGN PATENT DOCUMENTS

| | | |
|---|---|---|
| DE | 1 95 14 574 | 8/1996 |
| DE | 101 42 548 A1 | 4/2003 |
| SU | 1690580 | 11/1991 |
| WO | 2006/086934 | 8/2006 |

OTHER PUBLICATIONS

Translation of DE19514574, retrieved from EPO Dec. 20, 2008.*

* cited by examiner

METHOD FOR OPERATING A FECES CONVEYOR DEVICE

CROSS REFERENCE TO RELATED APPLICATIONS

This application is a divisional application of U.S. application Ser. No. 10/562,645, now U.S. Pat. No. 7,614,365, which is a National Stage of International Application No. PCT/DE2005/000994, filed on Jun. 2, 2005, and claims priority to German Patent Application No. 10 2005 007 120.1, which was filed on Feb. 17, 2005. The disclosure of U.S. application Ser. No. 10/562,645 is expressly incorporated by reference herein in its entirety.

BACKGROUND OF THE INVENTION

1. Field of the Invention

The invention relates to a method and a device for operating a manure transport device for livestock breeding operations.

2. Discussion of Background Information

Manure transport devices for livestock breeding operations comprising a manure conveyor belt driven in a circulating manner arranged underneath a stall floor and having a return roller are known, for example, from German Pat. No. DE 195 14 574 C1. This known device is suitable for poultry breeding operations where poultry excrete a relatively solid but moist manure in which a separation of manure and urine is not possible.

However, with the device according to DE 195 14 574 C1, the problem arises that it is difficult to guide planar textile structures as conveyor belts because they always have the tendency to slip from the drive and return rollers due to the fact that the textile structure does not allow a trouble-free guiding of the belt. Accordingly, with this known device, the straight course of the belt has been ensured by driving the return roller always at a higher rotational speed than the drive roller. Experiments have shown that this arrangement makes a trouble-free guiding of the manure conveyor belt possible.

Alternatively, U.S. Pat. No. 3,119,373 describes a demanuring cleansing arrangement in which an inclined plane preferably covered by plastic sheets is formed beneath a grating forming the stall of the stable animals. A pusher can glide on and can be moved over the inclined plane by a motor with the aid of a chain and roller drive. In order to maintain the conveyor device for this dung pusher constantly under tension, a tensioning device in the form of a spring is arranged at one of the two rotating shafts. The spring acts on the bearing of the rotating shaft for the roller that is not driven. Although the return roller is supported in a floating manner, this is not a driven return roller.

With livestock breeding operations in which animals are kept that excrete solid manure and liquid urine (e.g., pigs), considerable difficulties arise in carrying away this very moist, mushy mixture. A manure removal arrangement for small-animal farms is known, for example, from Published German Patent Application No. DE 35 28 604 A1. The arrangement has a two-part design comprising a liquid-tight floor part which serves as a urine collection channel, and a fall-through grating arranged above this liquid-tight floor channel. This fall-through grating is formed by a conveyor assembly or conveyor belt that does not comprise a circulating upper and lower belt half, but, rather, is composed of a single layer of a moisture-permeable material. The layer can, for example, be a mesh-like textile.

The use of such an arrangement in the case of swine breeding operations would not be successful, since the solid manure involved is still relatively soft and would fall through the fall-through grating.

If conveyor belts are used in swine breeding operations for the removal of the manure, a very quick fouling of the return rollers occurs so that the conveyor belts slip off laterally. Likewise, attempts in practice to embody the drive roller and/or the return roller in a convex manner in order to achieve a straight course of the conveyor belt have not been successful because the fouling is too great and the solid manure components equalize the convexity of the return roller and drive roller.

Moreover, attempts to design the return roller and/or drive roller as latticed rollers in order to achieve an appropriate guidance have not been successful either, since these rollers become clogged inside the lattice extremely quickly.

A method is known from US Patent Application Publication No. 2005/0028748 A1 in which the return roller can be shifted in the longitudinal axis of the manure conveyor belt. The return roller is acted upon by an adjustment device through which a tensioning of the manure conveyor belt is regulated, the adjustment device producing the tension on the manure conveyor belt being intermittently active. The return roller may be driven in the direction opposite to that of the drive roller. This known device has proven itself in practice, but is very expensive in constructional terms.

SUMMARY OF THE INVENTION

The invention provides a manure conveying device for livestock breeding operations in which a separation of manure and urine occurs, in which the straight course of the belt is guaranteed despite substantial fouling. According to aspects of the invention, a cleaning of the return rollers takes place. The device may be manufactured and operated very cost-effectively.

The invention is related to a method for operating a manure transport device for livestock breeding operations with a manure conveyor belt driven in a circulating manner, arranged underneath a manure-permeable stall floor, with two driven return rollers about which the belt circulates. Both driven return rollers are driven intermittently in the same direction at a different rotational speed and each return roller is driven more quickly or more slowly at intervals.

In embodiments, a method for a manure conveyor belt is proposed which is guided around two drive rollers—the front and the rear drive roller. Both drive rollers are driven intermittently, but run at different speeds. Thus, for example, the front drive roller is driven temporarily for a period of a few minutes rotating more quickly than the rear drive roller. After a certain rest period, i.e., stoppage of the belt, the rear return roller is driven more quickly than the front one. This switching can be accomplished most simply by a frequency controller, but can also be controlled by other electronic or electric devices.

The roller respectively driven more quickly in a circulating manner runs more quickly than the manure conveyor belt. As such, through the friction occurring between the roller and the underside of the belt, a cleaning of the belt and a cleaning of the roller takes place. At the same time the belt has the possibility of returning again to a straight course if it has drifted out of the straight course.

In embodiments, the rotational speed of the two rollers is very low. For example, the return roller driven more quickly circulates at a rotational speed of 1.5 rpm, while the return roller driven respectively more slowly is driven at a rotational speed of 1 rpm.

The invention further relates to a manure conveyor device for livestock breeding operations comprising a circulating manure conveyor belt arranged underneath a manure-permeable stall floor and guided around driven return rollers, the one return roller of which conveyor belt is adjustably supported for tensioning the belt. Additionally, the manure conveyor belt is embodied to be liquid-permeable, a manure collection channel is assigned to the discharge end of the upper belt half and a urine collection channel is assigned to the discharge end of the lower belt half, and at least the lower belt half runs in a liquid-tight trough.

In embodiments, a moisture-permeable manure conveyor belt is provided. A manure collection channel is assigned at one end of the belt (e.g., the upper belt half), and a urine collection channel is assigned to the other end of the belt (e.g., the lower belt half). The lower belt half circulates in a moisture-tight trough and the lower belt half conveys the collecting urine away to the urine collection channel.

Due to the slow rotational speed of the conveyor belt, the manure dries on the upper belt half and is transferred to the manure collection channel in a relatively solid, almost dry condition.

The manure conveyor belt preferably comprises a perforated plastic belt, whereby the size and type of the perforation depend on the case of application.

In implementations, the return rollers are made of stainless steel, so that it is possible to add acids to the urine in order to avoid ammonia losses. The trough in which the lower belt half runs is preferably formed by a corresponding plastic sheet, which has the characteristics of being absolutely leak-proof and having a high sliding ability. In this manner, the lower belt half, and thus the belt, can slide on this sheet without difficulty.

In embodiments, the trough is formed by lateral concrete strips that are preferably embodied inside plastic wall elements. These wall elements serve, with their base, as support for the lower belt half of the manure conveyor belt. An inclined roof surface provides a conveying of the manure towards the belt. In implementations, these wall elements are non-corroding.

The wall elements comprise individual sheets that, seen in the longitudinal direction, are connected among themselves to one another by stabilizing wires or bars inserted in eyelets formed in the rear walls of these sheets The wall elements lying opposite one another are also connected to one another by perforated sheet metal elements so that a solid construction is created.

Bearing rods are embedded in these wall elements and in the cement strips, which bearing rods support the upper belt half of the manure conveyor belt.

Implementations of the invention provide a manure transport device that ensures a separation of urine and solid manure, whereby the manure is transferred to the manure collection channel well dried. At the same time, a continuous conveyance of the manure and urine occurs, which ensures that a good stall climate (i.e., a high air quality) is achieved. Moreover, despite considerable fouling, the belt is always kept on a straight course and a continuous cleaning of the return rollers takes place. Since at least one return roller is tensioned, the plastic belt can always be kept sufficiently tensioned, irrespective of the temperatures and loads prevailing in the stall.

According to a first aspect of the invention, there is a method comprising driving a first return roller, about which a manure conveyor belt circulates, at a first rotational speed, and driving a second return roller, about which the manure conveyor belt circulates, at a second rotational speed. During a first interval the first rotational speed exceeds the second rotational speed, and during a second interval the second rotational speed exceeds the first rotational speed.

In embodiments, the first return roller and the second return roller are driven in a same direction. The method may further comprise driving the manure conveyor belt in a circulating manner underneath a manure-permeable floor, such that the manure conveyor device is structured and arranged for use with livestock breeding operations.

The method may further comprise controlling the first rotational speed and the second rotational speed by frequency controllers, and stopping the first return roller and the second return roller for a period of time between the first interval and the second interval. In implementations, the period of time is one to four minutes.

In embodiments, the first rotational speed is approximately 1.5 rpm during the first interval, and the first return roller has a diameter of approximately 90 to 110 mm. Moreover, the second rotational speed is approximately 1 rpm during the first interval, and the second return roller has a diameter of approximately 90 to 110 mm.

According to a second aspect of the invention, there is a manure conveying device comprising a liquid-permeable conveyor belt drivable around return rollers; a manure collection channel associated with a discharge end of an upper half of the conveyor belt; a urine collection channel associated with a discharge end of a lower half of the conveyor belt; and a liquid-tight trough through which the lower half of the conveyor belt travels.

The conveyor belt may comprise a circulating manure conveyor belt arranged underneath a manure permeable floor associated with livestock operations. Moreover, one of the return rollers may be adjustably supported for tensioning the conveyor belt.

In implementations, the conveyor belt comprises a perforated plastic belt, the return rollers are made of stainless steel, and a ground side of the trough is formed by a plastic sheet.

According to further aspects of the invention, the walls of the trough are formed by concrete strips. The device may further comprise wall elements structured and arranged to accommodate the concrete strips, wherein each respective wall element includes a vertical wall, a horizontal base element, and an inclined roof portion projecting in an inclined manner into an interior of the trough. The inclined roof portion may project behind the vertical wall on a side of the vertical wall opposite the trough. The wall elements may be made of plastic. Additionally, the device may further comprise tubular eyelets on an inside of the vertical wall structured and arranged to accommodated bars or wires to connect respective wall elements in a longitudinal direction. Also, the device may further comprise perforated sheet metal elements structured and arranged to connect respective wall elements in a transverse direction. Moreover, the device may further comprise bearing rods supported in the walls of the trough for supporting the upper half of the conveyor belt.

According to a third aspect of the invention, there is a manure conveyor device comprising a manure conveyor belt; a first return roller about which the manure conveyor belt circulates and a second return roller about which the manure conveyor belt circulates. A fit motor is structured and arranged to drive the first return roller, and a second motor is structured and arranged to drive the second return roller. The first return roller is driven faster than the second return roller during a first interval, the second return roller is driven faster than the first return roller during a second interval, and the first return roller and the second return roller are not driven during a time period between the first interval and the second interval.

The device may further comprise at least one frequency controller structured and arranged to drive the first return roller and the second return roller in a same direction and at different rotational speeds.

The device may additionally comprise a manure collection channel associated with a discharge end of an upper half of the manure conveyor belt, a urine collection channel associated with a discharge end of a lower half of the manure conveyor belt, and a liquid-tight trough through which the lower half of the manure conveyor belt travels.

BRIEF DESCRIPTION OF THE DRAWINGS

An exemplary embodiment of the invention will be explained below on the basis of the drawings, in which.

DETAILED DESCRIPTION OF THE PRESENT INVENTION

Figure 1:
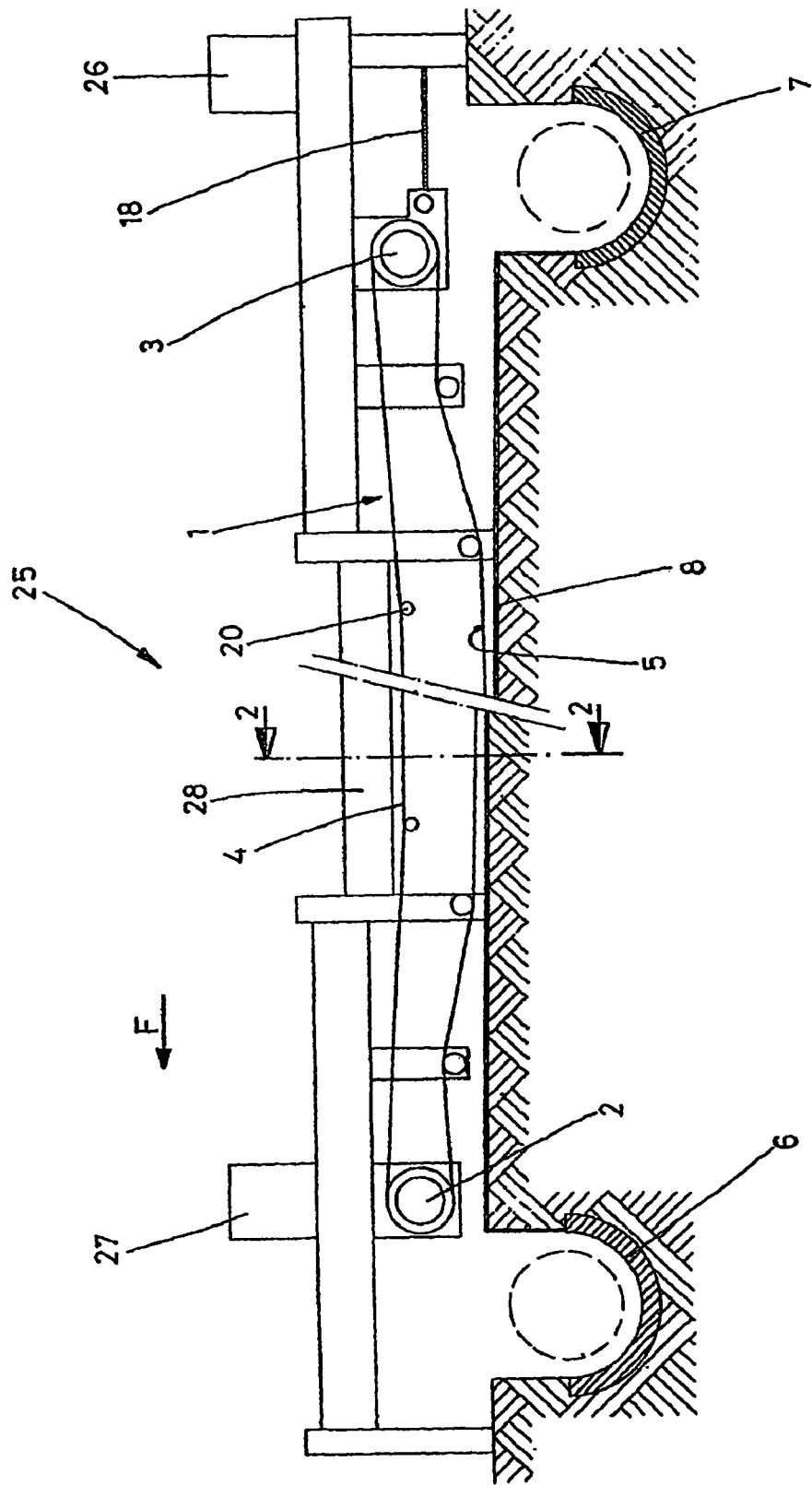
FIG. 1 shows a side view of a wall construction according to aspects of the invention.

FIG. 1 shows a manure transport device 25 that features a manure conveyor belt 1 which comprises, e.g., a perforated plastic belt that is guided around return rollers 2 and 3 so that an upper belt half 4 and a lower belt half 5 are formed. The belt may be used for livestock operations, such as, for example, underneath a manure-permeable stall floor 30 depicted diagrammatically in FIG. 2. The upper belt half 4 rests on bearing shafts 20 and the lower belt half 5 rests on a plastic sheet (not shown for clarity) lying on the base 8, so that a good sliding ability of the plastic belt on the plastic sheet of the base is ensured. The return roller 3 is supported in an adjustable manner so that it can be tensioned via a tensioning device 18. It is thus possible to keep the plastic belt 1 always equally tensioned constantly irrespective of prevailing temperature conditions. The tensioning device 18 can work mechanically, hydraulically or pneumatically and can be controlled automatically or individually.

Electric motors 27 and 26 are assigned to the return rollers 2 and 3 (i.e., both return rollers 2 and 3 are motor-driven). The manure conveyor belt 1 comprises a perforated plastic belt and at least the lower belt half 5 runs in a trough 9 that is limited by side walls 10 and 11.

In the exemplary embodiment shown, a manure collection channel 6 is assigned to the return roller 2 and the upper belt half 4 when the manure conveyor belt 1 circulates in the direction of the arrow F. A conveyor screw is shown diagrammatically in the manure collection channel 6. In such an embodiment, a urine collection channel 7 is assigned to the return roller 3. In this embodiment, the last end of the base 8 is inclined slightly, as depicted in FIG. 1, so that the urine conveyed to this end by the lower belt half 5 flows by itself to the urine collection channel 7.

Figure 2:
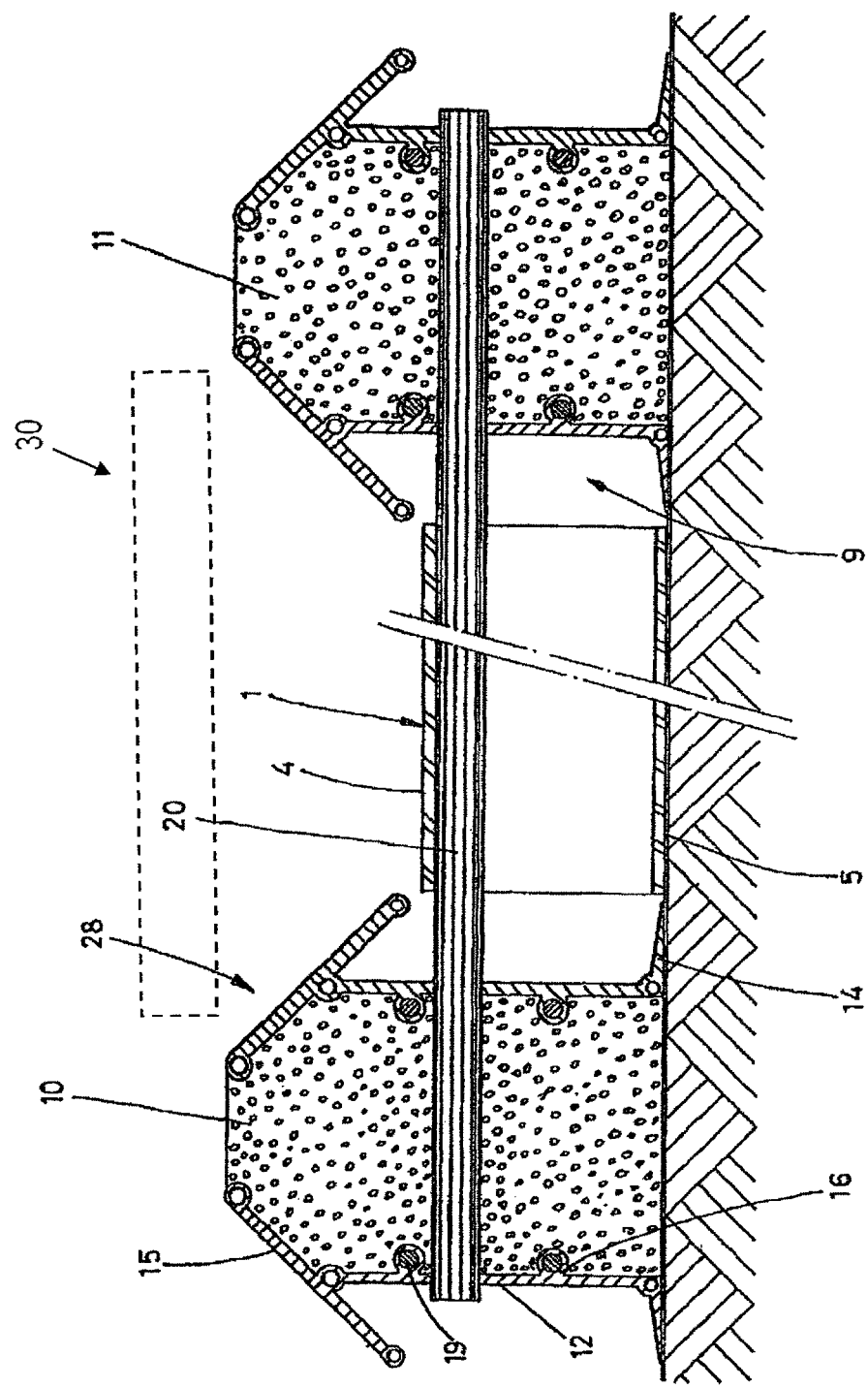
FIG. 2 shows a section according to the line 2-2 in FIG. 1.
Figure 3:
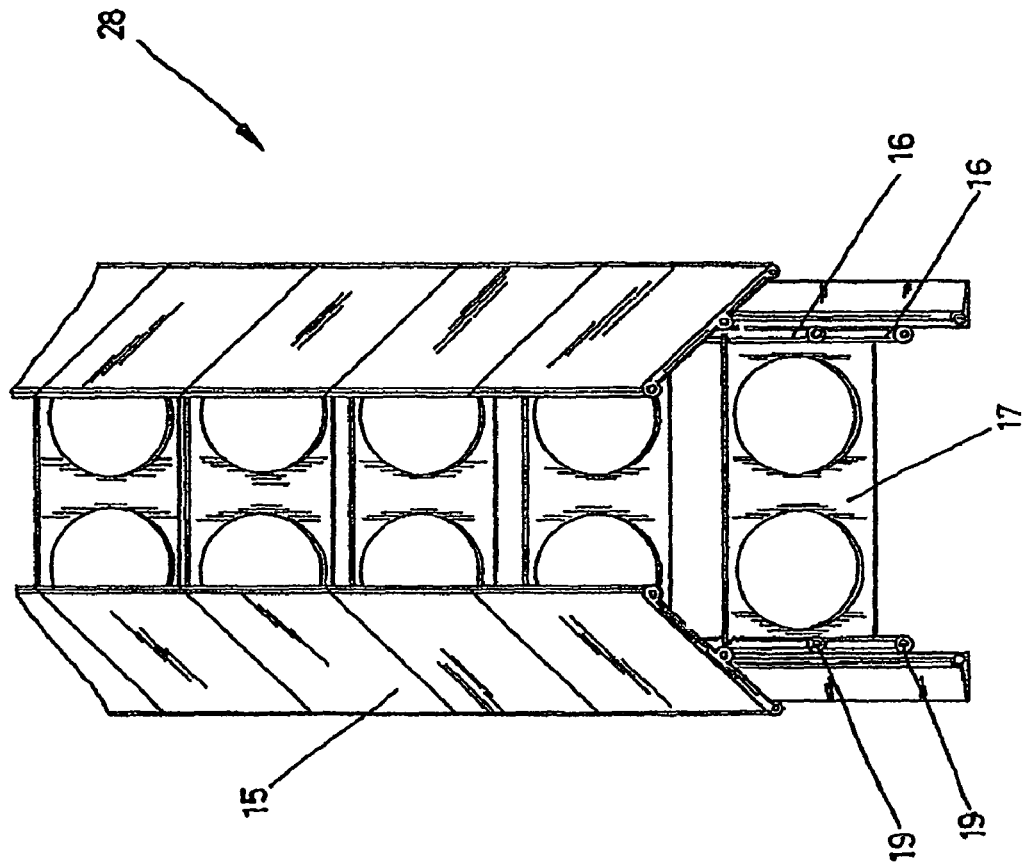
FIG. 3 shows, on a larger scale, an elevated view of several combined wall elements to accommodate the cement strips.

In FIG. 2, the walls 10 and 11 are made of concrete, in which concrete strips are limited by wall elements 28. Each wall element 28 comprises a vertical wall 12, a roof part 15 and a base part 14. The roof part 15 of the wall element 28 directed towards the trough interior is inclined towards the trough interior from the top downwards. The outer wall element 28 also supports such a roof part 15, but it is inclined outwards. Eyelets 16 are provided on the inside of the vertical walls 12. As shown in FIG. 3, the eyelets 16 accommodate the interconnecting bars 19 that connect the wall elements 28 to one another in their longitudinal direction. In the transverse direction, the wall elements 28 are connected to one another by perforated sheet metal elements 17 so that a "stable mold" is created for the concrete to be poured. Furthermore, bearing shafts 20 traverse both the wall elements 28 and the concrete strips on which the upper belt half 4 of the manure conveyor belt 1 rests.

The operation of this manure conveyor belt 1 is such that both return rollers 2 and 3 are driven via the electric motors 26 and 27. The motor 26 sometimes runs more quickly than the motor 27, and, after a certain time interval and a stoppage time, this drive is switched over so that the motor 26 runs more slowly and the motor 27 more quickly. Despite these different rotational speeds—of either the one or the other motor—the belt circulates in the same direction and always at the speed of the motor running more slowly.

However, the belt is not driven constantly. For example, after a period of 1-4 minutes both motors are stopped and only started up again after a time to be regulated individually. In this manner, the relatively solid manure resting on the upper belt half 4 has sufficient time to drain and also to dry in advance. The lower belt half 5 is immersed in the urine collecting there and, since the manure conveyor belt 1 is a perforated plastic belt, this perforated plastic belt now conveys the urine to the urine collection channel 7. At the same time the solid manure is transferred to the manure collection channel 6 and is conveyed away from there.

What is claimed:

1. A manure conveyor device, comprising:
   a liquid-permeable conveyor belt drivable around first and second return rollers;
   a manure collection channel associated with a discharge end of an upper half of the conveyor belt;
   a urine collection channel associated with a discharge end of a lower half of the conveyor belt; and
   a liquid-tight trough through which the lower half of the conveyor belt travels,
   wherein the conveyor belt comprises a perforated plastic circulating manure conveyor belt arranged underneath a manure permeable floor associated with livestock operations, and
   a ground side of the trough is formed by a plastic sheet;
   wherein the first return roller is driven faster than the second return roller during a first interval,
   the second return roller is driven faster than the first return roller during a second interval,
   the first return roller and the second return roller are not driven during a time period between a first interval and a second interval.

2. The manure conveyor device of claim 1, wherein one of the return rollers is adjustably supported for tensioning the conveyor belt.

3. The manure conveyor device of claim 1, wherein the return rollers are made of stainless steel.

4. The manure conveyor device of claim 1, wherein walls of the trough are formed by concrete strips.

5. The manure conveyor device of claim 4, further comprising bearing rods supported in the walls of the trough for supporting the upper half of the conveyor belt.

6. The manure conveyor device of claim 1, wherein the ground side of the trough extends from the manure collection channel to the urine collection channel.

7. The manure conveyor device of claim 1, further comprising a conveyor screw in the manure collection channel.

8. A manure conveyor device of claim 7, further comprising, comprising:
- a liquid-permeable conveyor belt drivable around return rollers;
- a manure collection channel associated with a discharge end of an upper half of the conveyor belt;
- a urine collection channel associated with a discharge end of a lower half of the conveyor belt; and
- a liquid-tight trough through which the lower half of the conveyor belt travels, the trough having walls formed by concrete strips,
- wherein the conveyor belt comprises a perforated plastic circulating manure conveyor belt arranged underneath a manure permeable floor associated with livestock operations,
- a ground side of the trough being formed by a plastic sheet; and
- wall elements structured and arranged to accommodate the concrete strips, wherein each respective wall element comprises:
- a vertical wall;
- a horizontal base element; and
- an inclined roof portion projecting in an inclined manner into an interior of the trough.

9. The manure conveyor device of claim 8, wherein the inclined roof portion projects behind the vertical wall on a side of the vertical wall opposite the trough.

10. The manure conveyor device of claim 8, wherein the wall elements are made of plastic.

11. The manure conveyor device of claim 8, further comprising tubular eyelets on an inside of the vertical wall structured and arranged to accommodated bars or wires to connect respective wall elements in a longitudinal direction.

12. The manure conveyor device of claim 8, further comprising perforated sheet metal elements structured and arranged to connect respective wall elements in a transverse direction.

13. A manure conveyor device, comprising:
- a manure conveyor belt;
- a first return roller about which the manure conveyor belt circulates;
- a second return roller about which the manure conveyor belt circulates;
- a first motor structured and arranged to drive the first return roller; and
- a second motor structured and arranged to drive the second return roller;
- wherein the first return roller is driven faster than the second return roller during a first interval,
- the second return roller is driven faster than the first return roller during a second interval,
- the first return roller and the second return roller are not driven during a time period between the first interval and the second interval, and
- the conveyor belt comprises a perforated plastic circulating manure conveyor belt arranged underneath a manure permeable floor associated with livestock operations; and
- a tensioning device arranged to adjustably support one of the first and second return rollers.

14. The manure conveyor device of claim 13, further comprising at least one frequency controller structured and arranged to drive the first return roller and the second return roller in a same direction and at different rotational speeds.

15. A manure conveyor device, comprising:
- a manure conveyor belt;
- a first return roller about which the manure conveyor belt circulates;
- a second return roller about which the manure conveyor belt circulates;
- a first motor structured and arranged to drive the first return roller;
- a second motor structured and arranged to drive the second return roller;
- a manure collection channel associated with a discharge end of an upper half of the manure conveyor belt;
- a urine collection channel associated with a discharge end of a lower half of the manure conveyor belt; and
- a liquid-tight trough through which the lower half of the manure conveyor belt travels,
- wherein the first return roller is driven faster than the second return roller during a first interval,
- the second return roller is driven faster than the first return roller during a second interval,
- the first return roller and the second return roller are not driven during a time period between the first interval and the second interval, and
- the conveyor belt comprises a perforated plastic circulating manure conveyor belt arranged underneath a manure permeable floor associated with livestock operations.

16. The manure conveyor device of claim 15, wherein a base of the trough extends from the manure collection channel to the urine collection channel.

* * * * *

UNITED STATES PATENT AND TRADEMARK OFFICE
CERTIFICATE OF CORRECTION

PATENT NO. : 7,827,938 B2  
APPLICATION NO. : 11/947512  
DATED : November 9, 2010  
INVENTOR(S) : J. Kuehlmann Page 1 of 1

It is certified that error appears in the above-identified patent and that said Letters Patent is hereby corrected as shown below:

Column 7, line 3 (claim 8, line 1) of the printed patent, after device, delete "of claim 7, further comprising,".

Signed and Sealed this
Twelfth Day of April, 2011

David J. Kappos
*Director of the United States Patent and Trademark Office*